United States Patent [19]
Campbell, Jr. et al.

[11] Patent Number: 5,805,752
[45] Date of Patent: Sep. 8, 1998

[54] ENVIRONMENT-PROOF FIBER OPTIC COUPLER

[75] Inventors: Daniel R. Campbell, Jr., Laurel; Richard Belt, Odenton; Roy L. Fox, Baltimore, all of Md.

[73] Assignee: ACS Industries, Inc., Woonsocket, R.I.

[21] Appl. No.: 702,874

[22] Filed: Aug. 26, 1996

[51] Int. Cl.$^6$ ................................................ G02B 6/245
[52] U.S. Cl. ............................................ 385/51; 385/43
[58] Field of Search ................................. 385/51, 15, 39, 385/42, 43, 46, 48, 50

[56] References Cited

U.S. PATENT DOCUMENTS

| | | | |
|---|---|---|---|
| 5,208,883 | 5/1993 | Hattori et al. | 385/43 |
| 5,251,276 | 10/1993 | Berkey et al. | 385/43 |
| 5,285,512 | 2/1994 | Duncan et al. | 385/94 |
| 5,293,440 | 3/1994 | Miles et al. | 385/51 |
| 5,367,591 | 11/1994 | Seike et al. | 385/51 |
| 5,384,875 | 1/1995 | Shannon et al. | 385/51 |
| 5,404,415 | 4/1995 | Mori et al. | 385/51 X |
| 5,426,714 | 6/1995 | Gadkaree et al. | 385/39 |
| 5,450,519 | 9/1995 | Iwanski et al. | 385/138 |
| 5,455,703 | 10/1995 | Duncan et al. | 359/152 |
| 5,479,548 | 12/1995 | Cote et al. | 385/51 |
| 5,500,917 | 3/1996 | Daniel et al. | 385/89 |

Primary Examiner—Phan T. H. Palmer
Attorney, Agent, or Firm—Larson & Taylor

[57] ABSTRACT

An environment-proof fiber optic coupler couples two optical fibers to one another at a coupled region. The optical fibers on each side of the coupled region are bonded to a central receiving substrate of a substrate part which together with a cover part bonded thereto forms a sleeve with open sleeve ends. The volume between the sleeve ends is then evacuated, and the sleeve returned to atmospheric pressure with the sleeve ends filled respectively with a cured and an uncured sleeve sealant. Air is drawn through the uncured sleeve sealant during evacuation, and thereafter the uncured sleeve sealant is drawn into the sleeve before curing such that the coupled region is protected by the sealed sleeve. Next, a tube is placed around the sealed sleeve which tube extends beyond the sealed sleeve ends thereof. With at least one of the tube ends filled with an uncured tube sealant, the volume between the tube ends is evacuated so that air is drawn through the uncured sealant which is thereafter drawn into the tube. Finally, the tube is then returned to atmospheric pressure and the uncured tube sealant is cured to form a sealed tube such that the sealed sleeve is protected by the sealed tube and hence the coupled region is protected sequentially by the sealed tube and then the sealed sleeve. In the preferred embodiment, a second tube is similarly used to provide a third seal about the first-mentioned tube.

16 Claims, 2 Drawing Sheets

ENVIRONMENT-PROOF FIBER OPTIC COUPLER

FIELD OF THE INVENTION

The present invention relates generally to fiber optic couplers, splitters and Wavelength Division Multiplexers, (all hereafter referred to generally as "couplers"), and more particularly to fiber optic couplers which have been hermetically sealed to prevent moisture penetration to the coupled region of the optical fibers.

BACKGROUND OF THE INVENTION

One of the key components in passive optical networks is the fiber optic coupler. Reliability concerns with couplers used in such networks have been well documented. Although manufacturers have made great advancements in coupler reliability, the key problem with these devices continues to be long-term exposure to heat and humidity found in any outdoor environment.

There are two main failure modes related to long-term exposure. First, humidity can degrade the glass which embodies the coupled region. When the optical fiber is manufactured, microscopic cracks can be formed. As humidity collects on the bare fibers in the coupled region, the moisture enters these micro-cracks and proliferates them. This causes coupler degradation and ultimately a system failure. A second failure mode occurs because every fiber optic coupler is attached to an internal substrate of a ceramic sleeve with epoxy. As epoxy bonds are exposed to humidity over time, the bonds absorb the moisture, swell and soften, and lose their holding strength. This causes performance degradation and eventual failure as the fibers are allowed to bend.

SUMMARY OF THE INVENTION

In accordance with the present invention, an environment-proof fiber optic coupler as well as a method for producing an environment-proof fiber optic coupler are provided. The coupler serves to couple two or more optical fibers to one another at a coupled region. In particular, the optical fibers on each side of the coupled region are bonded to a central receiving substrate of a substrate part of a ceramic or the like sleeve, which sleeve has open longitudinal sleeve ends and is split along a longitudinal plane to form the substrate part and a cover part. The receiving substrate is then covered with the cover part and the substrate part and cover part bonded together along mating longitudinal surfaces thereof so that the sleeve radially surrounds and radially seals the coupled region with the optical fibers extending through the open sleeve ends thereof which are unsealed. The volume between the sleeve ends of the sleeve is then evacuated, and the sleeve returned to atmospheric pressure with both sleeve ends filled with a sleeve sealant. One of these sleeve sealants is uncured such that the uncured sleeve sealant is partially drawn into the sleeve as the sleeve is returned to atmospheric pressure. The uncured sleeve sealant is then cured to form a sealed sleeve with sealed sleeve ends such that the coupled region is protected by the sealed sleeve.

Next, a tube with open longitudinal tube ends is placed in a position radially surrounding the sealed sleeve and extending longitudinally beyond the sealed sleeve ends thereof. The volume between the tube ends of the tube is evacuated, and the tube is returned to atmospheric pressure with both tube ends filled with a tube sealant. At least one of the tube sealants is uncured such that the uncured tube sealant is partially drawn into the tube as the tube is returned to atmospheric pressure. Finally, the uncured tube sealant is cured to form a sealed tube with sealed tube ends such that the sealed sleeve is protected by the sealed tube and hence the coupled region is protected sequentially by the sealed tube and then the sealed sleeve.

In accordance with a preferred embodiment of the present invention, the fiber optic coupler further includes a second tube with open longitudinal second tube ends placed in a position radially surrounding the sealed tube and extending longitudinally beyond the sealed tube ends thereof. The volume between the second tube ends of the second tube is then evacuated, and the second tube returned to atmospheric pressure with both second tube ends filled with a second tube sealant. At least one of the second tube sealants is uncured such that the uncured second tube sealant is partially drawn into the second tube as the second tube is returned to atmospheric pressure. The uncured second tube sealant is then cured to form a second sealed tube with sealed second tube ends such that the sealed tube is protected by the second sealed tube and hence the coupled region is protected sequentially by the second sealed tube, the sealed tube, and the sealed sleeve.

Also in accordance with the preferred embodiment, before evacuating the volume between the sleeve ends, the first sleeve end is filled with the sleeve sealant which is uncured. The sleeve sealant is then cured in the first sleeve end, followed by filling of a second sleeve end with the sleeve sealant which is uncured. Thereafter, the evacuating of the volume between the sleeve ends includes the drawing of gas from between the sleeve ends through the uncured sleeve sealant.

In one specific preferred embodiment, before the step of evacuating the volume between the tube ends, the first tube end is filled with the tube sealant which is uncured and which is then subsequently cured, and the second tube end is filled with the tube sealant which is uncured. Thus, the evacuating of the volume between the sleeve ends includes the drawing of gas from between the sleeve ends through the uncured tube sealant.

In still another specific preferred embodiment, before the step of evacuating the volume between the tube ends, the volume between the tube ends as well as both of the second tube ends is filled with the tube sealant which is uncured. Finally, the evacuating of the volume between the sleeve ends includes the drawing of any gas from between the sleeve ends through the uncured tube sealant.

In the preferred embodiment, the sleeve sealant is a heat curable sleeve epoxy and the tube sealant is a heat curable tube epoxy which are cured by applying heat thereto. In addition, an RTV material is added about the fibers emerging from the sealed second tube ends to resiliently support the optical fibers extending away from the coupler. Further, the first-mentioned tube and the second tube are preferably formed of INVAR. Still further, the sleeve is advantageously an outside circular cylinder.

It is an advantage of the present invention that an environment-proof coupler is provided which has three sealed chambers surrounding the coupled region of the optical fibers.

It is another advantage of the present invention that two of the chambers surrounding the coupled region are hermetically sealed to remove humidity and contaminants prior to sealing.

Other features and advantages of the present invention are stated in or apparent from detailed descriptions of presently preferred embodiments of the invention found hereinbelow.

DESCRIPTION OF THE PREFERRED EMBODIMENTS

Figure 4:
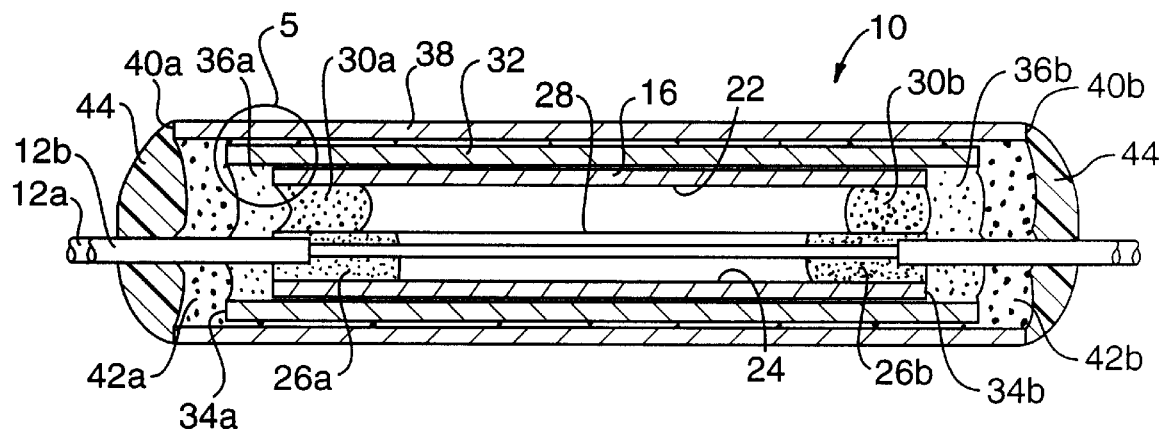
FIG. 4 is a cross-sectional front elevation view of a coupler according to the present invention.

With reference now to the drawings in which like numerals represent like elements throughout the views, a formed coupler package or coupler 10 is depicted in FIG. 4. Coupler 10 is designed to provide three sealed chambers, preferably provided by circularly cylindrical elements with sealed ends. In this manner, coupler 10 environmentally protects optical fibers 12a and 12b which are coupled together at a coupled region 14. Exemplary types of coupled regions to be protected in accordance with the present invention include polished coupled regions, planar waveguide coupled regions, filter coupled regions, and coupled regions based on grating technology. It will also be appreciated that more than two optical fibers could be coupled together at region 14 if desired.

Figure 1:
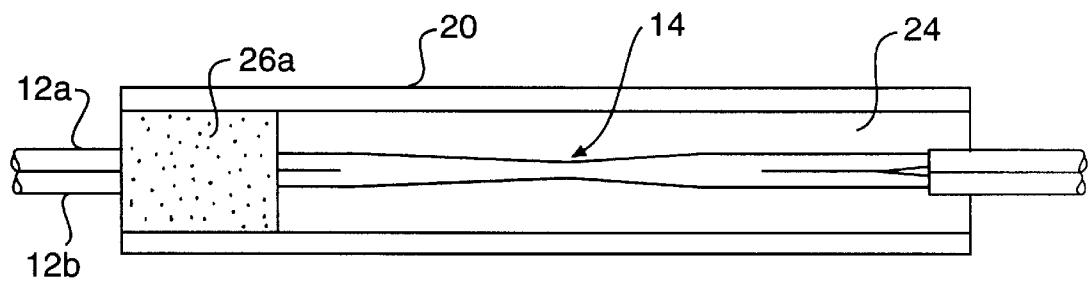
FIG. 1 is a top plan view of a substrate part of the inner sleeve of the coupler of the present invention.
Figure 2:
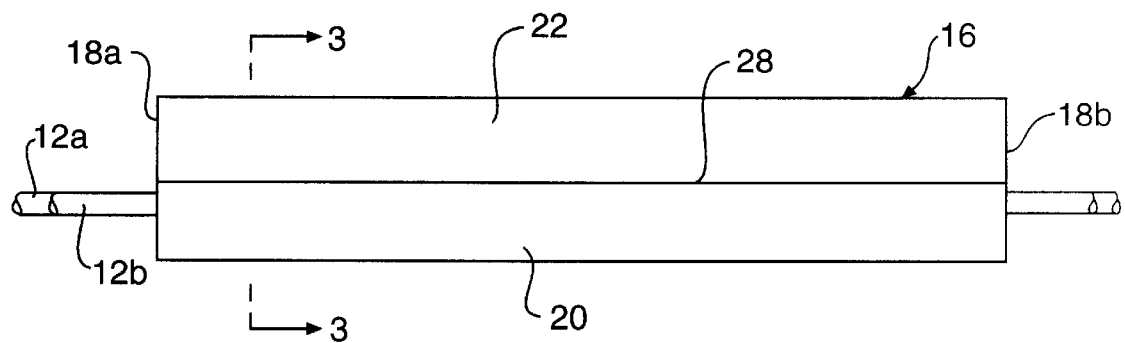
FIG. 2 is a front elevation view of the sleeve of the coupler of the present invention.

It will be appreciated that coupler 10 includes a centrally located ceramic (preferably fused silica, but optionally including quartz or glass, or other suitable materials well known in the art) sleeve 16 as depicted in FIG. 2. Ceramic sleeve 16 has longitudinal sleeve ends 18a and 18b, and is split along a longitudinal plane to form a substrate part 20 and a cover part 22. As depicted in greater detail in FIGS. 1 and 3, substrate part 20 includes a central receiving substrate 24 in which coupled region 14 is mounted by bonding with suitable epoxies 26a and 26b applied about optical fibers 12a and 12b on either side of coupled region 14 (only epoxy 26a on the left side of substrate part 20 is depicted in FIG. 1). Epoxies 26a and 26b are conveniently UV-cured epoxy adhesives, although a heat cured adhesive or other glass bonding or metallic bonding materials could be used.

Figure 3:
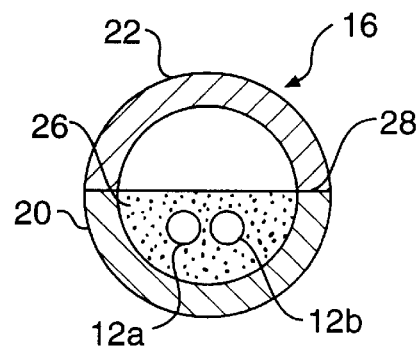
FIG. 3 is a cross-section side elevation view of the sleeve depicted taken along the line 3—3 in FIG. 2.

After mounting of coupled region 14 in substrate part 20, receiving substrate 24 is covered with cover part 22 to radially surround receiving substrate 24. Cover part 22 is further bonded to substrate 22 with an epoxy 28 located along the mating longitudinal surfaces of substrate part 20 and cover part 22. Coupled region 14 is thus completely surrounded (and sealed) radially by substrate part 20 and cover part 22, with optical fibers 12a and 12b extending out through the still open (as seen in FIG. 3) sleeve ends 18a and 18b as shown in FIG. 2.

In order to provide a first environmental/hermetic seal for coupled region 14, sleeve end 18b is initially filled with a heat curable epoxy sealant 30b (such as Epo-Tek 353 ND, manufactured by Epoxy Technologies, Inc.) although a UV-cured adhesive or other glass bonding or metallic bonding materials could be used. Epoxy sealant 30b is then heat cured to form an impervious seal in sleeve end 18b. Thereafter, an epoxy sealant 30a is used to fill sleeve end 18a. Ceramic sleeve 16 with uncured epoxy sealant 30a is then placed in a vacuum chamber, which is then evacuated. This evacuation causes the air and any moisture which is trapped between sleeve ends 18a and 18b to be drawn through uncured epoxy sealant 30a, so that little air or moisture remains about coupled region 14 in ceramic sleeve 16. After the air is drawn out of ceramic sleeve 16 through epoxy sealant 30a, ceramic sleeve 16 is returned to atmospheric pressure. Epoxy sealant 30a is drawn into sleeve end 18a somewhat as atmospheric pressure is returned due to the vacuum still present inside of ceramic sleeve 16, as shown by the bowed surfaces of epoxy sealant 30a. However, it will be appreciated that no air passes through epoxy sealant 30a (it is drawn in instead) so that the vacuum is maintained about coupled region 14. Finally, epoxy sealant 30a is cured so that ceramic sleeve 16 forms a first environmental/hermetic seal about coupled region 14 now provided in a vacuum.

In order to provide a second hermetic seal for coupled region 14, a first tube 32 with longitudinal first tube ends 34a and 34b is placed in a position radially surrounding sealed ceramic sleeve 16. First tube 32 is preferably formed of INVAR, a well known iron alloy containing 35.5% nickel and having a low coefficient of expansion at atmospheric temperatures; however stainless steel, ceramic, glass or plastic tubes could also be used. First tube ends 34a and 34b of first tube 32 extend at least slightly beyond sealed sleeve ends 18a and 18b of ceramic sleeve 16, with optical fibers 12a and 12b extending out through open first tube ends 34a and 34b. First tube end 34b is then initially filled with a heat curable epoxy sealant 36b (again, such as Epo-Tek 353 ND); although other suitable sealants such as UV-cured adhesives, glass bonds, metallic bonds or RTV sealants could also be used. Epoxy sealant 36b is then heat cured to form an impervious seal in first tube end 34b.

Figure 5:
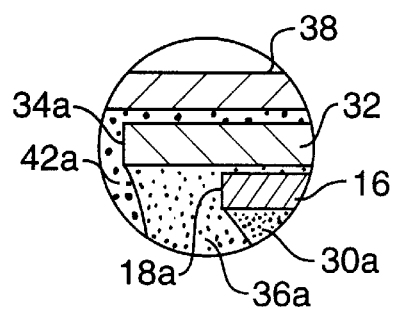
FIG. 5 is an enlarged view of the circled portion of FIG. 4 identified with the circle 5.

Thereafter, first tube 32 is positioned with sealed tube end 34b lowermost and an epoxy sealant 36a of the same material as epoxy sealant 36b is poured into tube end 34a to fill (as much as possible) the volume between first tube 32 and ceramic sleeve 16 as well as first tube end 34a. First tube 32 with sealed ceramic sleeve 16 therein and with uncured epoxy sealant 36a is then placed in a (or the same as used previously) vacuum chamber, which is then evacuated. This evacuation causes any small amounts (bubbles) of air (and any moisture) which is trapped between first tube ends 34a and 34b and about sealed ceramic sleeve 16 to be drawn through uncured epoxy sealant 36a, so that virtually no air remains between first tube ends 34a and 34b. After any air is drawn out of first tube 32, first tube 32 with ceramic sleeve 16 therein is returned to atmospheric pressure. A portion of epoxy sealant 36a in sleeve end 34a may be drawn into the small space provided between the outer diameter of ceramic sleeve 16 adjacent sleeve end 34a and the inner diameter of first tube 32 somewhat as atmospheric pressure is returned as shown in FIG. 5. However, it will be appreciated that no air passes through epoxy sealant 36a (especially in the small space) so that the vacuum is maintained in first tube 32. Finally, epoxy sealant 36a is cured so that sealed first tube 32 forms a hermetic seal about sealed ceramic sleeve 16 and hence forms a second sequential hermetic seal about coupled region 14.

Preferably, in order to provide a third hermetic seal for coupled region 14, a second tube 38 with longitudinal second tube ends 40a and 40b is placed in a position radially surrounding first tube 32. Second tube 38 is also preferably formed of INVAR, though second tube 38 could also be advantageously formed of stainless steel, ceramic (including glass), plastic or other material depending on the application anticipated or protection desired for coupler 10. Second tube ends 40a and 40b of second tube 38 extend at least slightly beyond sealed first tube ends 34a and 34b of first tube 32, with optical fibers 12a and 12b extending out through open second tube ends 40a and 40b. Second tube end 40b is then initially filled with a heat curable epoxy sealant 42b (such as Epo-Tek 377, also manufactured by Epoxy Tech., and warranted by the manufacturer to provide a hermetic seal) or other hermetic sealant such as UV-cured adhesives, glass bonds, metallic bonds or RTV sealants. Epoxy sealant 42b is then heat cured to form an impervious seal in second tube end 40b.

Thereafter, second tube 38 is positioned with sealed tube end 40b lowermost and an epoxy sealant 42a of the same material as epoxy sealant 42b is poured into second tube end 40a to fill (as much as possible) the volume between second tube 38 and first tube 32 as well as second tube end 40a. Second tube 38 with both sealed first tube 32 and sealed ceramic sleeve 16 therein and with uncured epoxy sealant 42a is then placed in a (or the same as used previously) vacuum chamber, which is then evacuated. This evacuation causes any small amount of air (and any moisture) which is trapped between second tube ends 40a and 40b and about sealed first tube 32 to be drawn through uncured epoxy sealant 42a, so that virtually no air remains between second tube ends 40a and 40b. After the air is drawn out of second tube 38, second tube 38 with first tube 32 and ceramic sleeve 16 therein is returned to atmospheric pressure. A portion of epoxy sealant 42a in first tube end 34a may be drawn into the small space provided between the outer diameter of first tube 32 adjacent first tube end 34a and the inner diameter of second tube 38 somewhat as atmospheric pressure is returned as shown in FIG. 5. However, it will be appreciated that no air passes through epoxy sealant 42a (especially in the small space) so that the vacuum is maintained in second tube 38. Finally, epoxy sealant 42a is cured so that sealed second tube 38 forms a hermetic seal about both sealed first tube 32 and sealed ceramic sleeve 16 and hence forms a third sequential hermetic seal about coupled region 14.

Finally, coupler 10 is completed by adding an RTV material 44 about optical fibers 12a and 12b emerging from both sealed second tube ends 40a and 40b. RTV material 44 resiliently supports the optical fibers 12a and 12b as they extend away from coupler 10.

As an alternative to the method mentioned above to provide the hermetic seals for first tube 32 and second tube 38, instead of filling the volumes between ceramic sleeve 16 and first tube 32 and between first tube 32 and second tube 38 with respective sealants 36a and 42a, only respective first and second tube ends 34a and 40a need to be filled as only a very little volume of air will be left in the associated volume. When this is done, during the associated evacuation, the small amount of air in the associated volume will be drawn out through the uncured sealant. Thereafter, when returned to atmospheric pressure, there will be more of the uncured sealant drawn into the associated volume from the tube end (and the volume may even include some reduced pressure or empty space). However, no air will be passed through the associated sealant in the tube end, and the hermetic seal will still be provided as soon as the uncured sealant is cured.

As another alternative to the method mentioned above to provide the hermetic seals for first tube 32 and for second tube 38, instead of separately curing sealants 36a and 36b for first tube 32 and sealants 40a and 40b for second tube 38 (i.e., instead of first curing sealant 36b in first tube end 34b and then sealant 36a in the volume between ceramic sleeve 16 and first tube 32 as well as in first tube end 34a), sealants 36a and 36b as well as sealants 40a and 40b can be restively poured or injected into one tube end until the other tube end and the volume therebetween is filled. Subsequent thereto, the filled tube can be evacuated so that any small amount of air (bubbles) present is drawn out through the sealant in either tube end (rather than through only one tube end as discussed above). When returned to atmospheric pressure, there may be some uncured sealant drawn into each tube end of the associated tube end, but no air will be passed through the associated sealant present at both tube ends. The uncured sealant is then finally cured to provide the desired hermetic seal.

While the present invention has been described with respect to exemplary embodiments thereof, it will be understood by those of ordinary skill in the art that variations and modifications can be effected within the scope and spirit of the invention.

We claim:

1. A method for producing an environment-proof fiber optic coupler for two optical fibers coupled to one another at a coupled region, comprising the steps of:

bonding the optical fibers on each side of the coupled region to a central receiving substrate of a substrate part of a sleeve, which sleeve has open longitudinal sleeve ends and is split along a longitudinal plane to form the substrate part and a cover part;

covering the receiving substrate with the cover part and bonding the substrate part and cover part together along mating longitudinal surfaces thereof whereby the sleeve radially surrounds and radially seals the coupled region with the optical fibers extending through the open sleeve ends thereof which are unsealed;

evacuating the volume between the sleeve ends of the sleeve;

returning the sleeve to atmospheric pressure with both sleeve ends filled with a sleeve sealant and with the coupled region free from the sleeve sealant, one of the sleeve sealants being uncured such that the uncured sleeve sealant is drawn into the sleeve;

curing the uncured sleeve sealant to form a sealed sleeve with sealed sleeve ends such that the sealant free coupled region is protected by the sealed sleeve;

placing a tube with open longitudinal tube ends in a position radially surrounding the sealed sleeve and extending longitudinally beyond the sealed sleeve ends thereof;

evacuating the volume between the tube ends of the tube;

returning the tube to atmospheric pressure with both tube ends filled with a tube sealant, at least one of the tube sealants being uncured such that the uncured tube sealant is drawn into the tube; and curing the uncured tube sealant to form a sealed tube with sealed tube ends such that the sealed sleeve is protected by the sealed tube and hence the coupled region is protected sequentially by the sealed tube and then the sealed sleeve.

2. A method for producing a fiber optic coupler as claimed in claim 1 and further including the steps of:

placing a second tube with open longitudinal second tube ends in a position radially surrounding the sealed tube and extending longitudinally beyond the sealed tube ends thereof;

evacuating the volume between the second tube ends of the second tube;

returning the second tube to atmospheric pressure with both second tube ends filled with a second tube sealant, at least one of the second tube sealants being uncured such that the uncured second tube sealant is drawn into the second tube; and curing the uncured second tube sealant to form a second sealed tube with sealed second tube ends such that the sealed tube is protected by the second sealed tube and hence the coupled region is protected sequentially by the second sealed tube, the sealed tube, and the sealed sleeve.

3. A method for producing a fiber optic coupler as claimed in claim 2 wherein before said step of evacuating the volume between the sleeve ends, the method comprises the steps of filling a first sleeve end with the sleeve sealant which is uncured, subsequent curing of the sleeve sealant in the first sleeve end, and filling a second sleeve end with the sleeve sealant which is uncured;

wherein said step of evacuating the volume between the sleeve ends includes the step of drawing of gas from between said sleeve ends through the uncured sleeve sealant;

wherein before said step of evacuating the volume between the tube ends, the method comprises the steps of filling a first one of the tube ends with the tube sealant which is uncured, subsequent curing of the tube sealant in the first one of the tube ends, and filling of a second one of the tube ends with the tube sealant which is uncured; and wherein said step of evacuating the volume between the tube ends includes the step of drawing of gas from between said tube ends through the uncured tube sealant.

4. A method for producing a fiber optic coupler as claimed in claim 2 wherein before said step of evacuating the volume between the sleeve ends, the method comprises the steps of filling a first sleeve end with the sleeve sealant which is uncured, subsequent curing of the sleeve sealant in the first sleeve end, and filling a second sleeve end with the sleeve sealant which is uncured;

wherein said step of evacuating the volume between the sleeve ends includes the step of drawing of gas from between said sleeve ends through the uncured sleeve sealant;

wherein before said step of evacuating the volume between the tube ends, the method comprises the steps of filling a first one of the tube ends with the tube sealant which is uncured, subsequent curing of the tube sealant in the first one of the tube ends, and filling of the volume between the tube ends as well as a second one of the tube ends with the tube sealant which is uncured; and wherein said step of evacuating the volume between the tube ends includes the step of drawing of any gas remaining from between said tube ends through the uncured tube sealant.

5. A method for producing a fiber optic coupler as claimed in claim 2 wherein before said step of evacuating the volume between the sleeve ends, the method comprises the steps of filling a first sleeve end with the sleeve sealant which is uncured, subsequent curing of the sleeve sealant in the first sleeve end, and filling a second sleeve end with the sleeve sealant which is uncured;

wherein said step of evacuating the volume between the sleeve ends includes the step of drawing of gas from between said sleeve ends through the uncured sleeve sealant;

wherein before said step of evacuating the volume between the tube ends, the method comprises the steps of filling of the volume between the tube ends as well as both of the tube ends with the tube sealant which is uncured; and wherein said step of evacuating the volume between the tube ends includes the step of drawing of any gas remaining from between said tube ends through the uncured tube sealant.

6. A method for producing a fiber optic coupler as claimed in claim 2 wherein the sleeve sealant is a heat curable sleeve epoxy and the steps of curing the sleeve sealants each include the step of applying heat to the sleeve epoxy; and wherein the tube sealant is a heat curable tube epoxy and the steps of curing the tube sealants each include the step of applying heat to the tube epoxy.

7. A method for producing a fiber optic coupler as claimed in claim 2 and further including the step of adding an RTV material about the fibers emerging from the sealed second tube ends to resiliently support the optical fibers extending away from the coupler.

8. A method for producing a fiber optic coupler as claimed in claim 2 wherein the sleeve is formed of a ceramic material and the first-mentioned tube and the second tube are formed of INVAR.

9. A method for producing a fiber optic coupler as claimed in claim 8 wherein said bonding step includes the initial step of providing the sleeve as an outside circular cylinder.

10. An environment-proof fiber optic coupler for two optical fibers coupled to one another at a coupled region comprising:

a sleeve having longitudinal sleeve ends and being split along a longitudinal plane including (a) a substrate part having a central receiving substrate to which the optical fibers on each side of said coupled region are bonded, (b) a cover part bonded to said substrate part along mating longitudinal surfaces so that the coupled region is completed surrounded radially by said substrate part and said cover part with the optical fibers extending through said sleeve ends, and (c) a respective sleeve sealant filling only each of said sleeve ends such that a sealed sleeve is formed which protects the coupled region which is sleeve sealant free;

a tube radially surrounding the sealed sleeve and extending longitudinally beyond said sleeve ends, said tube having longitudinal tube ends and a respective tube sealant filling and sealing each of said tube ends such that a sealed tube is formed which protects the sealed sleeve and hence the coupled region.

11. An environment-proof fiber optic coupler as claimed in claim 10 and further including a second tube radially surrounding the sealed tube and extending longitudinally beyond said tube ends, said second tube having longitudinal second tube ends and a respective second tube sealant filling and sealing each of said second tube ends such that a second sealed tube is formed which protects the sealed tube and hence the sealed sleeve and the coupled region.

12. An environment-proof fiber optic coupler as claimed in claim 11 wherein said sleeve is formed of a ceramic material and said first-mentioned tube and said second tube are made of INVAR.

13. An environment-proof fiber optic coupler as claimed in claim 12 wherein said sleeve has an outside circularly cylindrical shape.

14. An environment-proof fiber optic coupler as claimed in claim 11 and further including a respective RTV material about the fibers emerging from each respective second tube end to resiliently support the optical fibers extending away from the coupler.

15. An environment-proof fiber optic coupler as claimed in claim 11 wherein a volume between said tube ends is filled with said tube sealant and a second volume between said second tube ends is filled with said second tube sealant.

16. An environment-proof fiber optic coupler as claimed in claim 10 wherein said sleeve sealants are a heat curable sleeve epoxy and wherein said tube sealants are a heat curable tube epoxy.

* * * * *